United States Patent [19]

Parrer et al.

[11] Patent Number: 5,202,551
[45] Date of Patent: Apr. 13, 1993

[54] READING DEVICE FOR AN INTEGRATED CIRCUIT CARD

[75] Inventors: Peter Parrer, Bad Vöslau; Radko Pavlovec, Vienna, both of Austria

[73] Assignee: U.S. Philips Corporation, New York, N.Y.

[21] Appl. No.: 706,812

[22] Filed: May 29, 1991

[30] Foreign Application Priority Data

Jun. 1, 1990 [AT] Austria ................................. 1197/90

[51] Int. Cl.$^5$ ......................... G06F 13/04; G06K 7/06
[52] U.S. Cl. ................................... 235/486; 235/441; 235/479
[58] Field of Search ............... 235/486, 475, 477, 479, 235/483, 482, 485, 441; 360/99.02, 99.06, 97.1, 97.2

[56] References Cited

U.S. PATENT DOCUMENTS

| | | | |
|---|---|---|---|
| 4,724,310 | 2/1988 | Shimamura et al. | 235/483 |
| 4,734,567 | 3/1988 | Hansbauer | 235/482 X |
| 4,878,139 | 10/1989 | Hasegawa et al. | 360/99.02 |
| 4,904,852 | 2/1990 | Mita et al. | 235/479 |
| 4,914,279 | 4/1990 | Massey | 235/482 X |
| 4,926,032 | 5/1990 | Shimamura et al. | 235/479 |
| 4,926,033 | 5/1990 | Kobayashi | 235/475 |
| 5,036,430 | 7/1991 | Hills | 361/399 |
| 5,047,616 | 9/1991 | Maresch et al. | 235/435 |
| 5,060,096 | 10/1991 | Hirose et al. | 360/99.06 |
| 5,060,101 | 10/1991 | Isomura | 360/99.06 |

Primary Examiner—Eugene R. LaRoche
Assistant Examiner—Christopher R. Glembocki
Attorney, Agent, or Firm—Brian J. Wieghaus

[57] ABSTRACT

A reading device for an integrated circuit card includes a slide movable in an insertion direction of the integrated circuit card between a rest and an operational position and is loaded by a spring in a direction opposite to the insertion direction. The slide is blocked in its rest position by a locking device switchable between a blocking position and first and second release positions. The locking device is loaded by a further spring in the direction of the blocking position when the integrated circuit card is not inserted. At the end of an insertion movement of an integrated circuit card past a read position into an adjacent over position, the locking device is switched into its first release position by the integrated circuit card, whereby the slide is moved from its rest position into its operational position. During movement of the slide, a contact carrier is moved into contact with contacts on the circuit card. Upon release of the insertion force from the circuit card, the locking device moves the card into the reading position while its contacts are contacted by the associated contacts in the contact carrier. The slide includes a manual control operable to move the slide from its operational position into its rest position in the insertion direction, the locking device being returned to its blocking position again and the integrated circuit card being ejected from the scanning device by the locking device after this rest position has been reached.

21 Claims, 2 Drawing Sheets

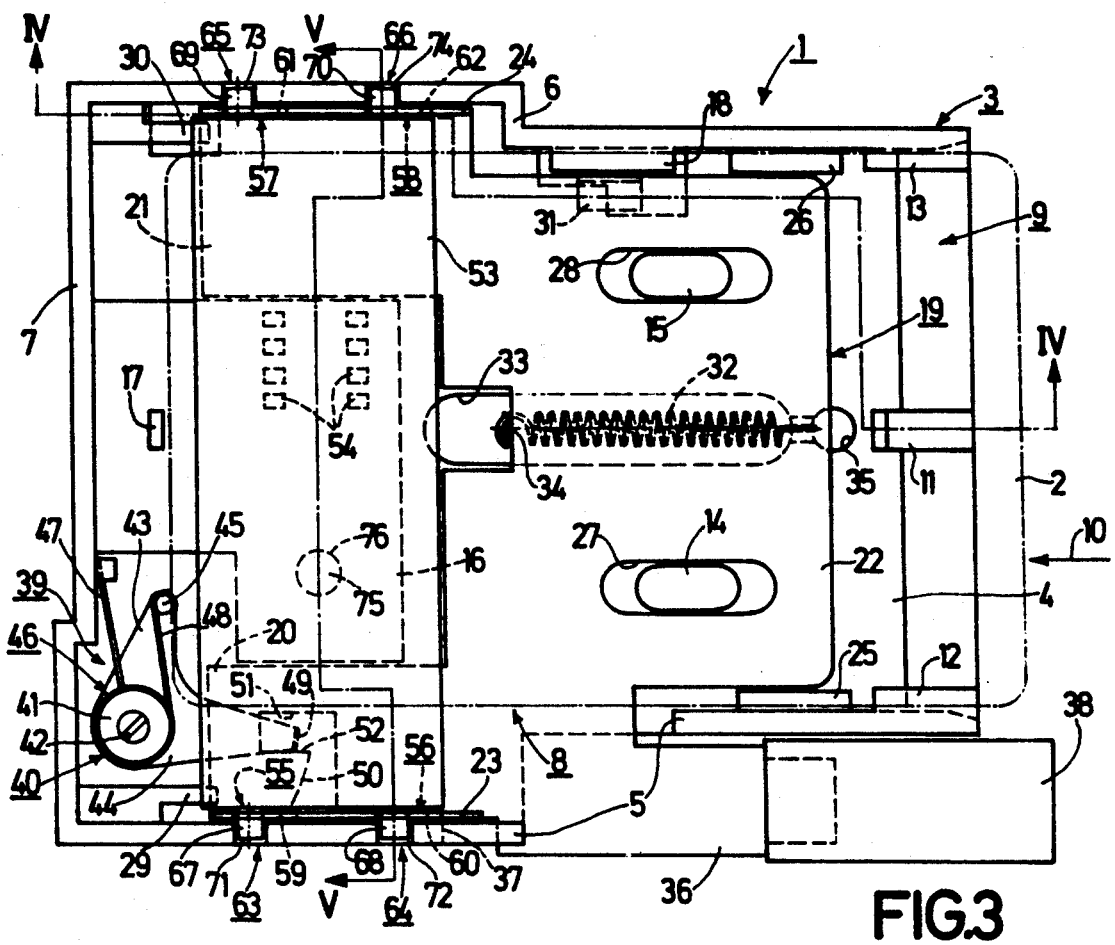
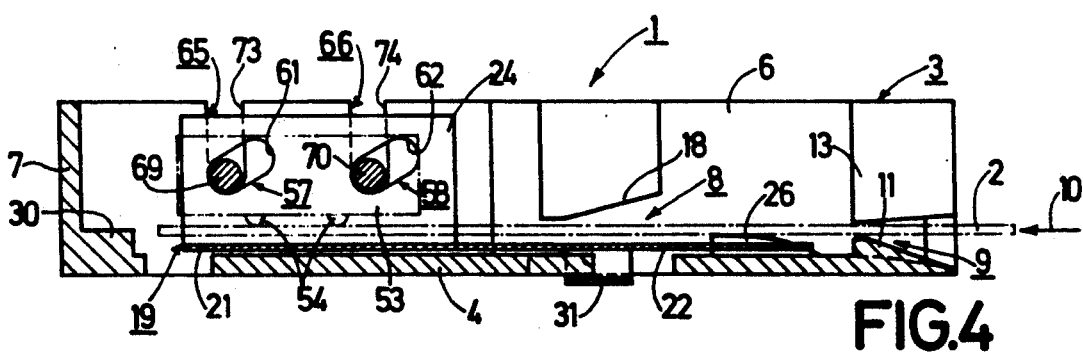
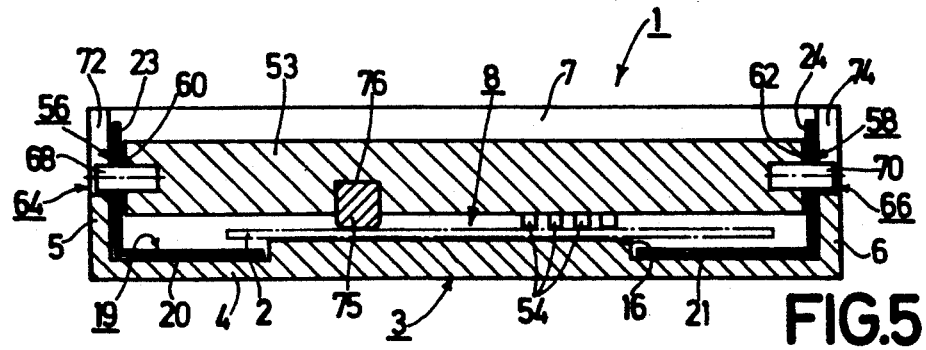
FIG.3
FIG.4
FIG.5

READING DEVICE FOR AN INTEGRATED CIRCUIT CARD

BACKGROUND OF THE INVENTION

The invention relates to a reading device for an integrated circuit card comprising a frame with a holding space for the integrated circuit card into which the integrated circuit card can be inserted through an inlet opening in an insertion direction into a reading or scanning position, comprising a slide which is adjustably guided over the frame substantially parallel to the insertion direction between a rest position and an operational position and is loaded by at least one spring against the insertion direction, which is moved from its rest position into its operational position upon the insertion of an integrated circuit card into its scanning position, and upon whose movement from its operational position into its rest position the integrated circuit card is moved from its scanning position against the insertion direction, and comprising a manual control which can be operated in the insertion direction and upon whose actuation the slide is shifted from its operational position into its rest position.

Such a reading or scanning device for an integrated circuit card is known, for example, from U.S. Pat. No. 4,724,310. In this known scanning device, the slide, which is constructed as a frame, lies closer to the inlet opening for the insertion and retrieval of an integrated circuit card in its rest position than in its operational position, in which it lies further away from the inlet opening. Upon the insertion of an integrated circuit card into the scanning device, the integrated circuit card hits against a rim projecting from the slide after slightly more than half the insertion path, after which, when the integrated circuit card is inserted further, the slide is shifted by the integrated circuit card acting on the said rim against the force of the spring loading the slide in the insertion direction of the integrated circuit card from its rest position towards its operational position. During this, the slide hits against an L-shaped, also spring-loaded control lever and carries the latter along, so that then, when the integrated circuit card is still further inserted, the force of the spring loading the L-shaped control lever is also to be overcome. In this known scanning device, an unloaded, smooth insertion of the integrated circuit card is possible only during approximately the first half of the insertion movement of the integrated circuit card, therefore, whereas during the remaining insertion movement the insertion of the integrated circuit card takes place against the force of the spring loading the slide and, subsequently, also against the additional force of the spring loading the L-shaped control lever, so that already after slightly more than half the insertion movement the insertion becomes comparatively heavy, which heaviness is even increased further towards the end of the insertion. This is felt to be unpleasant and inconvenient by many users of this known scanning device. In addition, the spring forces working against the insertion may also lead to a comparatively strong mechanical load on an integrated circuit card to be inserted.

The manual control which is constructed as a pushbutton can be actuated by a user in order to take out an integrated circuit card from the scanning device after completion of a scanning cycle in the known scanning device according to said U.S. Pat. No. 4,724,310. The pushbutton is thereby separately retained in the frame with adjustment possibility and cooperates with a locking lever which, when the pushbutton is actuated, releases a control slide which is then moved into an end position by a torsion spring with two legs which at one side grips the slide, and at the other side grips the said L-shaped, also spring-loaded control lever which cooperates with the slide, whereby the control slide swivels two locking bars provided for gripping behind an integrated circuit card positioned in its scanning position into a release position in which the locking bars release the integrated circuit card, so that the integrated circuit card is shifted from its scanning position by the rim of the slide under the force of the spring acting on the slide. As a result, the integrated circuit card is ejected from the scanning device through the inlet opening so far that it can be gripped and pulled from the scanning device by hand. As is apparent from the above description, the manual control constructed as a pushbutton is actuated, the ejection of the integrated circuit card from the scanning device is achieved. Such a complicated mechanism, however, makes the scanning device more expensive, more liable to break down, and shortens its operational life.

SUMMARY OF THE INVENTION

The invention has for its object to avoid the difficulties described above by simple means and to achieve a smooth insertion of the integrated circuit card into a scanning device of the type described in the opening paragraph during substantially the entire insertion movement of the integrated circuit card, and to dispense with a comparatively complicated, manually operated mechanism for the ejection of an integrated circuit card from the scanning device.

To achieve this object, the invention is characterized in that a locking device is provided which can be switched between a locking position and a release position, which is biased by at least one further spring in the direction of its locking position and which in its locking position locks the slide against the force of the spring biasing this slide in its rest position. The locking device has a control stop which is actuated by the integrated circuit card and by which the locking device can be moved against the force of the further spring into its release position by the integrated circuit card at the end of its insertion into its scanning position. After the locking device has been set in its release position, the slide can be shifted from its rest position into its operational position under the force of the spring loading it against the insertion direction. The manual control is provided at the slide and the slide can be shifted in the insertion direction from its operational position into its rest position through actuation of the manual control of the slide against the force of the spring loading it. After a shift of the slide into its rest position the locking device can be moved into its locking position under the force of the further spring, whereby the integrated circuit card is moved from its scanning position in a direction opposite to the insertion direction by the control stop of the locking device. It is achieved in this way that an integrated circuit card upon its insertion in the scanning device does not hit against the control stop of the locking device until the end of the insertion path, so that advantageously a smooth insertion is achieved during substantially the entire insertion movement of an integrated circuit card. It is advantageously achieved by this, furthermore, that the tensioning of the spring loading the slide is done by hand during actuation of the manual control and not by the integrated circuit card during its insertion. A minimum overall mechanical on an integrated circuit card during its insertion into the scanning device is safeguarded by this. Since the manual control is provided at the slide, a particularly simple construction is obtained in which a satisfactory solution is found without a complicated mechanism controllable by the manual control for the ejection of an integrated circuit card, which is advantageous because of its high operational reliability, long life, and minimum manufacturing cost. When an integrated circuit card during its insertion into the scanning device according to the invention has reached its scanning position, the slide is shifted in a direction opposite to the insertion direction under the force of the spring biasing it, so that also the manual control provided at the slide is shifted against the insertion direction, which advantageously provides the user of the scanning device with a clearly visible sign that the integrated circuit card has been correctly inserted into its scanning position by him/her.

With the integrated circuit card in its scanning position, the control stop of the locking device can press against the integrated circuit card under the force of the further spring. To fix the integrated circuit card in its scanning position in this case, the slide may switch at least one movable retaining hook from a rest position into a retaining position during its movement from its rest position into its operational position against the insertion direction, in which retaining position the retaining hook grips behind the rear end, seen in the insertion direction, of the integrated circuit card present in its scanning position, thus fixing it in its scanning position. It has proved to be advantageous, however, if the slide comprises a limit stop against which the locking device rests with a counterstop under the force of the further spring when the slide has been shifted into its operational position. It is achieved in this way that, when the integrated circuit card is in its scanning position, the force of the further spring is absorbed by the slide present in its operational position, so that the further spring does not exert any force on the integrated circuit card present in its scanning position via the control stop of the locking device. Thus a satisfactory solution can be advantageously found without separate means for holding the integrated circuit card in its scanning position. The integrated circuit card may, for example, be securely retained in its scanning position by the frictional forces acting on it.

The locking device may consist, for example, of various parts; it may also comprise only a locking slide movably provided oblique to the insertion direction. It has been found advantageous if the locking device comprises a single two-arm locking lever pivoting in bearings in the frame, which lever has at its one arm the control stop which can be operated by the integrated circuit card and at its other arm a blocking stop provided for blocking the slide in its rest position. A simple and smooth construction for the locking device has been achieved by this, which can in addition be simply and lightly dimensioned and adjusted, in order to achieve a desired ejection stroke for the integrated circuit card.

The locking lever may comprise a separate blocking stop and a separate counterstop. It has proved to be particularly advantageous if the blocking stop also forms the counterstop with which the locking lever rests against the limit stop of the slide when the slide has been moved to its operational position. The blocking stop advantageously fulfils a double function by this, which is advantageous in view of a particularly simply construction of the locking lever.

The slide may be constructed and arranged in various ways, for example, in the form of a frame or of a beam, and next to, above, or below an integrated circuit card. It has proved to be advantageous if the slide is substantially plate-shaped and runs with its plate surface substantially parallel to the card surface of the integrated circuit card. A simple and mechanically stable construction of the slide is achieved by this, which in addition has the advantage of having the smallest possible constructional height perpendicular to the card surface of the integrated circuit card.

In a scanning device according to the invention, which comprises a contact carrier which is movable towards and away from the integrated circuit card, which is coupled to the slide in order to be movable, and which carries contacts which can be brought into contact with countercontacts at the integrated circuit card through shifting of the slide into its operational position and through the accompanying movement of the contact carrier towards the integrated circuit card, it has proved to be advantageous if the substantially plate-shaped slide comprises two side plates projecting perpendicularly therefrom, in that the contact carrier is coupled to the slide by means of pin-slot links acting between the contact carrier and the two side plates, whose slots run obliquely relative to the plate surface of the slide, and in that the contact carrier is movably arranged at the frame perpendicular to the card surface of the integrated circuit card. An interlocking and forced, and thus particularly secure motion of the contact carriers both towards and away from the integrated circuit card is safeguarded in this way by particularly simple means.

Guiding of the contact carrier may be achieved in various ways, for example, in that the contact carrier is guided directly in slotted recesses in the side of the frame. It has proved to be advantageous if the contact carrier is movably guided at the frame by means of pin-slot guides acting between the contact carrier and the frame. A simple and smooth guiding for the contact carrier is achieved by this which protects it against tilting and jamming.

It has further proved to be advantageous if the pins of the pin-slot links and of the pin-slot guides are connected to the contact carrier and project laterally therefrom, and the slots of the pin-slot links are provided in the side plates of the slide, while the slots of the pin-slot guides are provided in the frame. This is advantageous for achieving the simplest possible assembly during the manufacture of the scanning device.

It has further been found to be particularly advantageous if each of the pins belongs to both a pin-slot link and a pin-slot guide. The pins thus fulfil a double function, which is advantageous for achieving a particularly simple assembly.

With the contact carrier moved towards the integrated circuit card, the integrated circuit card can only be positioned as to its horizontal level, so perpendicular to the card surface, by the contacts of the contact carrier bearing on the countercontacts. Since these contacts are practically always spring-loaded, no secure horizontal positioning of the integrated circuit card is safeguarded thereby. It has accordingly proved advantageous if the contact carrier comprises at least one pressure element arranged next to the contacts, which element presses against the integrated circuit card, thus pressing the integrated circuit card against a support surface at the frame when the slide is positioned in its operational position and the contact carrier has accordingly been moved towards the integrated circuit card. A reliable horizontal positioning of the integrated circuit card present in its scanning position is achieved by this. It is also possible with such a pressure element to lock the integrated circuit card against shifting from its scanning position.

BRIEF DESCRIPTION OF THE DRAWING

The invention will be described in more detail below with reference to an embodiment represented in the drawings, to which, however, the invention should not be limited.

FIG. 3 shows in a manner analogous to that in FIG. 1 the scanning device of FIG. 1, but with an integrated circuit card inserted into the scanning device up to its scanning, or reading, position, the slide being moved into its operational position and the locking lever being swivelled to its release position.

FIG. 4 shows in a manner analogous to that of FIG. 2 in a cross-section taken on the line IV—IV in FIG. 3 the scanning device of FIG. 3.

FIG. 5 shows in a cross-section taken on the line V—V in FIG. 3 a detail of the scanning device of FIG. 3, which specifically refers to the contact carrier of the scanning device.

DESCRIPTION OF THE PREFERRED EMBODIMENTS

Figure 1:
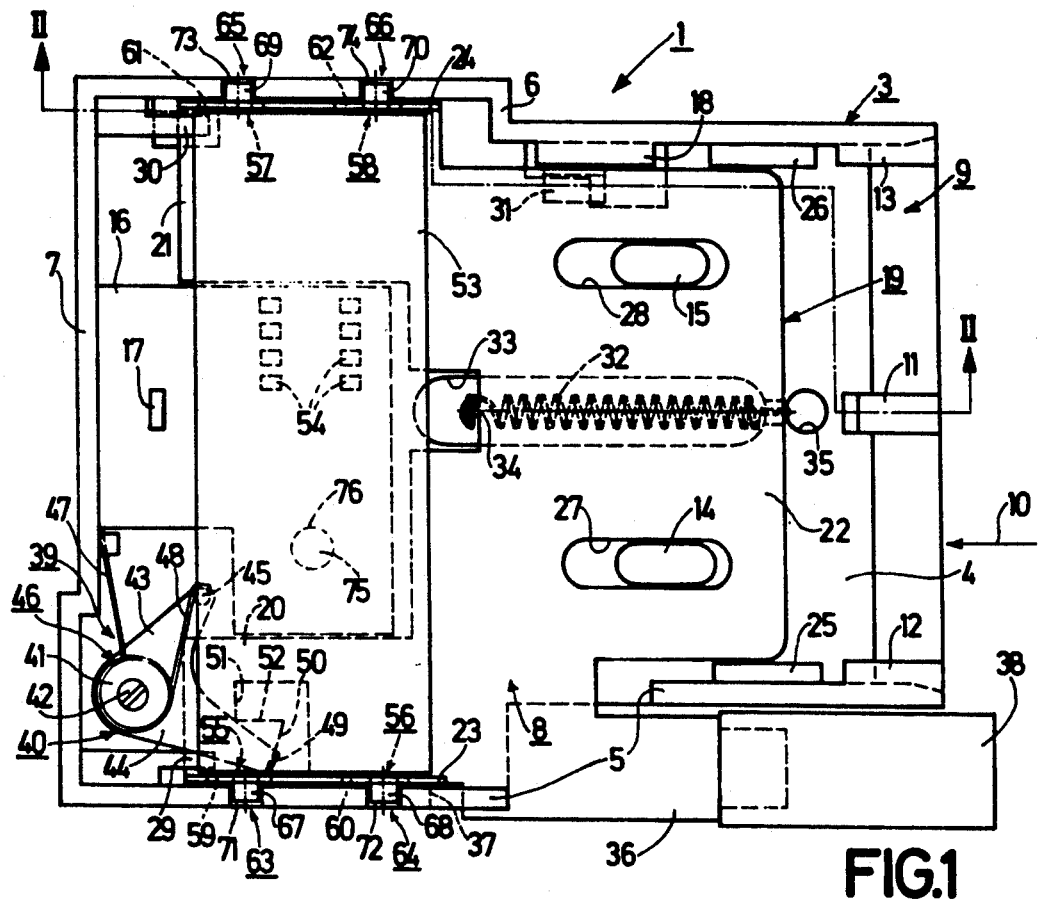
FIG. 1 is a plan view of a scanning device for an integrated circuit card on an enlarged scale, no integrated circuit card being inserted into this scanning device, while a slide of the scanning device which is movably supported between a rest position and an operational position is blocked in its rest position by means of a locking lever which can be swivelled between a blocking position and a release position, which lever in FIG. 1 occupies its blocking position.

FIGS. 1 to 5 show a scanning device 1 for an integrated circuit card 2. The integrated circuit card 2 is diagrammatically shown in FIGS. 3 to 5 with dash-dot lines. The scanning device 1 comprises a substantially tub-shaped frame 3 made of synthetic material. The frame 3 has a bottom wall 4, from which a first side wall 5 consisting of two mutually offset portions, a second side wall 6 with a 90° offset portion, and a back wall 7 also with a 90° offset portion extend perpendicularly.

A holding space 8 for an integrated circuit card 2 is provided in the frame 3. An integrated circuit card 2 can be passed into the holding space 8 through an inlet opening 9 provided in the front region of the scanning device 1 in an insertion direction indicated with an arrow 10 into a scanning, or reading, position. The scanning position of the integrated circuit card 2 in the scanning device 1 is visible in FIGS. 3, 4 and 5. The inlet opening 9 is bounded laterally by the two side walls 5 and 6 and altitudinally by a rib 11 which is raised from the bottom wall 4 and shows a rising trend in the insertion direction 10, and by two ribs 12 and 13, which project from the side walls 5 and 6, respectively. The two ribs 12 and 13 show a falling trend towards the bottom wall 4 in the insertion direction 10 in their regions adjoining the bottom wall 4. The two side walls 5 and 6 of the frame 3 partly serve to bound the holding space 8 for the integrated circuit card 2 in lateral direction. Furthermore, the frame 3 comprises two oval elevations 14 and 15 raised above the bottom wall 4 for limiting the height of the holding space, on which elevations the integrated circuit card 2 rests. Furthermore, the height of the holding space 8 is limited by a support surface 16 raised above the bottom wall 4 and of approximate L-shape in plan view, against which the integrated circuit card 2 is pressed, as will be described in more detail below, while a stop 17 raised above the support surface 16 is provided for lateral bounding of the holding space 8, which stop limits the maximum insertion path of the integrated circuit card 2. Finally, the frame 3 also comprises a further rib 18 raised inside the side wall 6 for limiting the height of the holding space 8, which rib shows a falling trend towards the bottom wall 4 in the insertion direction 10 in its region facing the bottom wall 4.

The scanning device 1 comprises a steel slide 19 which is constructed substantially in a U-shape in plan view according to FIGS. 1 and 3 and which has a first leg portion 20, a second leg portion 21, and a bridge portion 22 interconnecting the two leg portions 20 and 21. The slide 19 is substantially plate-shaped and runs with its plate surface parallel to the card surface of the integrated circuit card 2 and parallel to the bottom wall 4 of the frame 3. The slide 19 lies with its leg portions 20 and 21 and with its bridge portion 22 directly against the bottom wall 4 of the frame 3, which is advantageous for achieving the smallest possible constructional height. The substantially plate-shaped slide 19 has two side plates 23 and 24 raised perpendicularly therefrom, the side plate 23 projecting from the first leg portion 20 and the side plate 24 projecting from the second leg portion 21 at right angles.

Figure 2:
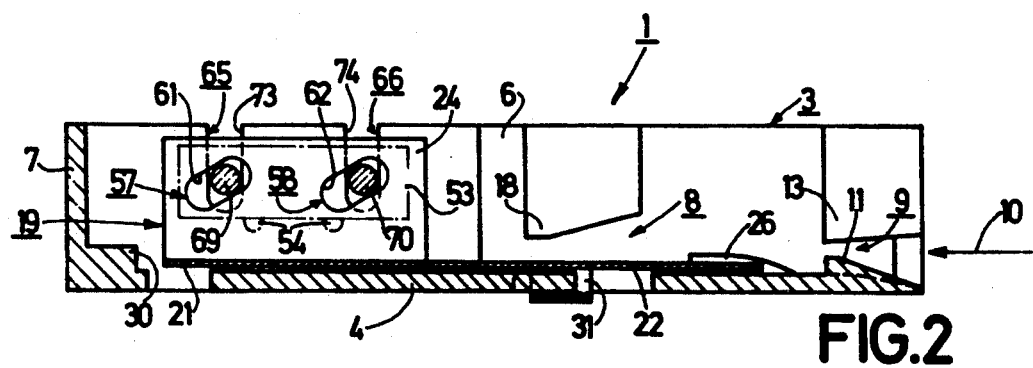
FIG. 2 shows in a cross-section taken on the line II—II in FIG. 1 the scanning device of FIG. 1, a contact carrier of the scanning device being only diagrammatically shown with dash-dot lines.

The slide 19 is supported at the frame 3 with movement possibility parallel to the insertion direction 10 between a rest position represented in FIGS. 1 and 2 and an operational position represented in FIGS. 3 and 4. The lateral guiding of the slide 19 takes place partly by means of its side plates 23 and 24, which for this purpose cooperate with the side walls 5 and 6 of the frame 3. Furthermore, two guide ribs 25 and 26 projecting from the side walls 5 and 6 of the frame 3 are provided for lateral guiding of the slide 19. An additional lateral guiding is achieved by the two oval elevations 14 and 15 which are passed through slots 27 and 28 in the bridge portion 22 of the slide 19. For altitudinal guiding, the slide 19 rests against the bottom wall 4 of the frame 3 and is covered in the region of its leg portions 20 and 21 by respective hold-down tabs 29 and 30 projecting from the frame 3. The slide 19 grips below the bottom wall 4 of the frame 3 with an L-shaped hook 31 which forms a right angle with the bridge portion 22. The slide 19 is held against the bottom wall 4 of the frame 3 by the hold-down tabs 29 and 30 and the hook 31 and thus held in position as regards its height.

The slide 19 is loaded by a spring 32, constructed as a tension spring, against the insertion direction 10. The tension spring 32 hereby is arranged in an oblong recess 33 in the bottom wall 4 of the frame 3 and hooked into the bottom wall 4 at one side at an extension 34 which projects at right angles from the bridge portion 22 of the slide 19 into the recess 30 and at the other side in a hole 35 provided in the bottom wall 4.

In the transition zone between the first leg portion 20 and the bridge portion 22, the slide 19 comprises an actuation portion 36 projecting therefrom in a direction opposite to the insertion direction 10. The actuation portion 36 is guided in a slot 37 provided between the bottom wall 4 and the side wall 5 of the frame 3 of the frame 3 in its region forming the transition to the first leg portion 20 to provide an additional altitudinal guidance of the slide 19. A manual control constructed as a pushbutton is connected to the free end of the actuation portion 36. The pushbutton 38, however, may alternatively be formed by the actuation portion 36 itself, in which case the actuation portion 36 could be longer and formed at its free end, for example, into a U-shape by means of two bends. The connection of the pushbutton 38 to the actuation portion 36 is effected by means of a snap connection (not shown); alternatively, it may be effected as a glued connection. The pushbutton 38 can be operated by hand in the insertion direction 10, by which operation the slide 19 is moved from its operational position into its rest position.

The scanning device 1, furthermore, comprises a locking device 39 for the slide 19 which can be switched between a blocking position represented in FIG. 1, a first release position, and a second release position represented in FIG. 3. The locking device 39 in a particularly simple manner here comprises only a single two-arm locking lever 40 which can pivot in bearings at the frame 3. The locking lever 40 is provided with a cylindrical base 41 through which a fastening screw 42 is passed and screwed into the frame 3, whereby the locking lever 40 is pivotable about a threadless bolt portion of the fastening screw 42. The locking lever 40 comprises a first arm 43 and a second arm 44. A pin 45 projects from the first arm 43 in a direction away from the bottom wall 4. A torsion spring 46 provided as a further spring is arranged on the cylindrical base 41 of the locking lever 40, a first leg 47 of which spring rests against the rear wall 7 of the frame 3 and a second leg 48 bears on the pin 45, so that the locking lever 40 is loaded in the direction of its blocking position represented in FIG. 1. The torsion spring 46 is of comparatively slight dimensions, so that it exerts only a small spring force. The blocking position of the locking lever 40 is so determined thereby that the locking lever 40 rests with its second arm 44 against the side plate 23 of the slide 19. In this blocking position, the locking lever 40 locks the slide 19 against the force of the tension spring 32 loading it in its rest position. For this purpose, the locking lever 40 comprises at the end of its second arm 44 a flap-shaped blocking stop 49 which projects from said second arm in the direction of the bottom wall 4. This blocking stop 49 cooperates with a contact surface 50 which has the shape of a circular arc, and which is provided in the region of a recess 51 provided in the first leg portion 20 of the slide 19, into which recess the blocking stop 49 projects.

The locking lever 40, as stated above, comprises a pin 45 projecting from its first arm 43. The pin 45 projects into the holding space 8 for the integrated circuit card 2. This pin 45 in addition forms a control stop which can be operated by an integrated circuit card 2 and via which the locking device 39 can be switched to its first release position by the integrated circuit card at the end of its insertion into its over position. After a movement of the locking device 39 into its first release position, the slide 19 is movable under the force of the tension spring 32 loading it against the insertion direction 10 from its rest position represented in FIG. 1 to its operational position represented in FIG. 3.

In the region of the recess 51 provided in the first leg portion 20, the slide comprises a contact surface 52 which forms a limit stop against which, as can be seen in FIG. 3, the locking device 39 is supported with a counterstop in the second release position under the force of the torsion spring 46 when the slide is in its operational position. In this case, the blocking stop 49 of the locking lever 40 is utilized in a particularly simple manner as a counterstop. Since the locking lever 40 is supported with its blocking stop 49 against the contact surface 52 of the slide 19 moved into its operational position, it is advantageously achieved that no force is exerted on the integrated circuit card 2 present in its scanning position by the torsion spring 46 via pin 45 because the force exerted by the torsion spring 46 on the locking lever 40 is absorbed by the slide 19 via the blocking stop 49 and the contact surface 52.

As mentioned above, the manual control 38 constructed as a pushbutton is provided directly at the slide 19 in a particularly simple manner. The slide 19 is movable against the force of the tension spring 32 loading it in the insertion direction 10 from its operational position to its rest position through operation of the manual control 38. After a movement of the slide 19 into its rest position, the locking device 39 is switched from the second release position into its blocking position under the force of the torsion spring 46 after the contact surface 52 of the slide 19 has released the blocking stop 49 of the locking lever 40. In such a switch-over of the locking device 39 to its blocking position, the pin 45 of the locking device 39 provided as a control stop pushes the integrated circuit card 2 against the insertion direction 10 from its read position toward the inlet opening.

The scanning device 1 further comprises a contact carrier 53 which is represented only diagrammatically in FIGS. 1 to 5. The contact carrier 53 can be moved towards and away from the integrated circuit card 2. For this movement, the contact carrier 53 is coupled to the slide 19. The contact carrier 53 carries contacts 54 which can be brought into contact with countercontacts on the integrated circuit card 2 through shifting of the slide 19 into its operational position and the ensuing movement of the contact carrier 53 towards the integrated circuit card 2. The countercontacts at the card side are not shown in FIGS. 3 to 5 for the sake of simplicity. The contact carrier 53 is coupled to the slide 19 in a very simple and space-saving manner via pin-slot links 55, 56, 57, 58 which act between the contact carrier 53 and the two side plates 23 and 24, and whose slots 59, 60, 61, 62 run obliquely relative to the plate surface of the slide 19. The contact carrier 53 is guided with adjustment possibility at the frame 3 transverse to the card surface of the integrated circuit card 2. In the present case, the contact carrier 53 is guided with an exactly perpendicular adjustment possibility relative to the card surface of the integrated circuit card 2 and to the bottom wall 4 of the frame 3, which, however, need not necessarily be the case. The contact carrier 53 is here movably guided at the frame 3 by means of pin-slot guides 63, 64, 65, 66 which act between the contact carrier 53 and the two side walls 5 and 6 of the frame 3, so that a simple, smooth guiding, which protects against tilting and jamming, is achieved for the contact carrier 53. As is apparent from the Figures, the pins 67, 68, 69, 70 of the pin-slot links 55, 56, 57, 58 and the pin-slot guides 63, 64, 65, 66 are connected to the contact carrier 53, from which they project laterally. The slots 59, 60, 61, 62 of the pin-slot links 55, 56, 57, 58 are provided in the side plates 23 and 24 of the slide 19, and the slots 71, 72, 73, 74 of the pin-slot guides 63, 64, 65, 66 are provided in the frame 3, i.e. in its side walls 5 and 6. This has proved to be advantageous for a simple assembly. In that case, each of the pins 67, 68, 69, 70 belongs to both a pin-slot link 55, 56, 57, 58 and a pin-slot guide 63, 64, 65, 66, so that a satisfactory solution is found with a small number of pins.

As is apparent from FIGS. 1 to 4, but especially from FIG. 5, the contact carrier 53 comprises a pressure element 75 arranged at a distance next to the contacts 54. The pressure element 75 is formed by, for example, a cylindrical plug consisting of silicone rubber, which plug is accommodated in a recess 76 in the contact carrier 53. As FIG. 5 shows, the pressure element 75 presses against the integrated circuit card 2 when the slide 19 is moved to its operational position, and the contact carrier 53 is accordingly moved towards the integrated circuit card 2, so that the integrated circuit card 2 is pressed against the contact surface 16 at the frame 3 and an exact vertical positioning of the integrated circuit card 2 present in its scanning position is safeguarded.

The operation of the scanning device 1 for an integrated circuit card 2 described above is briefly described in the following section.

To bring an integrated circuit card 2 into the scanning or reading position represented in FIG. 3, this card is inserted in the insertion direction 10 through the inlet opening 9 into the holding space 8 for the integrated circuit card 2. Advantageously, this takes place without any oppositions during practically the entire insertion movement without any opposition, so particularly smoothly, which is very pleasant for a user and spares the card. It is not until practically the end of the insertion movement of the integrated circuit card 2 that the latter hits against the pin 45, upon which the locking device 39 is switched from the blocking position shown in FIG. 1. This switch-over of the locking device 39 takes place against the force of the comparatively weak torsion spring 46 and against the frictional force exerted by the slide 19 loaded by the tension spring 32 and by its contact surface 50 on the blocking stop 59, the value of which depends on the force of the tension spring 32 and on the frictional coefficients. Since in the case of usual frictional coefficients of 0.1 to 0.2 this frictional force represents only a fraction of the spring force of the tension spring 32, this share in the forces loading the locking device 39 plays no substantial part, so that the overall forces working against a switch-over of the locking device 39 into its release positions are slight, and accordingly the mechanical load on the integrated circuit card 2 occurring at the end of the insertion of an integrated circuit card 2 is also only slight. Upon further insertion of the integrated circuit card 2, the actual reading position thereof is passed by a very small extra travel, until the integrated circuit card 2 hits against the stop 17 at the contact surface 16 in an over position of the circuit card. The locking device 39 is moved from the blocking position to the second release position via the integrated circuit card 2. During this movement the blocking stop 49 is lifted from the contact surface 50 at the slide 19, after which the slide 19 under the force of the tension spring 32 acting on it is shifted against the insertion direction 10 from its rest position into its operational position. Owing to this shifting of the slide 19, the contact carrier 53 is moved towards the integrated circuit card 2 by means of the pin-slot links 55, 56, 57, 58, while the pressure element 75 provided at the contact carrier 53 presses the integrated circuit card 2 against the contact surface 16 and the contacts 54 of the contact carrier 53 make contact with the countercontacts at the card side (not shown). The operational position of the slide 19 is determined via the pin-slot links 55, 56, 57, 58 by the contact carrier 53 resting with its pressure element 75 on the integrated circuit card 2. When subsequently the user of the scanning device 1 removes the pressure exerted by hand on the integrated circuit card 2, the integrated circuit card 2 is shifted by the above-mentioned slight extra travel against the insertion direction 10 because of the force exerted by the torsion spring 46 on the integrated circuit card 2 via the pin 45. This slight shifting of the integrated circuit card 2 from the over position into the read position leads to a relative movement between the contacts 54 at the contact carrier 53 and the countercontacts at the card side, which has a cleaning effect and safeguards a reliable contacting. The above-mentioned slight shifting of the integrated circuit card 2 against the insertion direction 10 takes place until the blocking stop 49 rests against the contact surface 52 in the recess 51 of the slide 19 in the second release position of the locking device 39, so that then the force of the torsion spring 46 is absorbed by the slide 19 and cannot cause a further shifting of the integrated circuit card 2 out of the read position against the insertion direction 10. The integrated circuit card 2 is then no longer loaded by the torsion spring 46 and is now frictionally held in its scanning position by the pressure element 75, which is particularly simple. As stated, the slide 19 is shifted against the insertion direction 10 after the completed insertion of an integrated circuit card 2 into its read position. During this, the manual control 38 connected to the slide 19 is also shifted, which advantageously provides the user with a clearly visible sign that the integrated circuit card has been correctly inserted into its scanning position by him. In order to effect such an indication particularly clearly, the manual control 38 may in addition be provided with visible marks: for example, with a coloured field which is only visible if the manual control 38 has been shifted against the insertion direction 10.

For the ejection of a previously inserted integrated circuit card 2 from the scanning device 1, the manual control 38 is operated by hand in the insertion direction 10, so that the slide 19 is shifted in the insertion direction 10 from its operational position into its rest position, whereby the tension spring 32 loading the slide 19 is tensioned. The force for tensioning the tension spring 32, therefore, is advantageously applied by hand in the present scanning device 1, and not via the integrated circuit card 2, which is advantageous in view of a smallest possible mechanical load on the integrated circuit card 2. Owing to this movement of the slide 19, the contact carrier 53 is moved away from the integrated circuit card 2 via the pin-slot links 55, 56, 57, 58, so that the pressure element 75 and the contacts 54 are lifted from the integrated circuit card 2. The moment the slide 19 has been moved so far through actuation of the manual control 38 in the insertion direction 10 that its contact surface 52 releases the blocking stop 49, the locking lever 40 is pivoted by the torsion spring 46 out of its second release position into its blocking position in which the locking lever 40 rests with its second arm 44 against the side plate 23 of the slide 19. Owing to this pivoting of the locking lever 40, the integrated circuit card 2 is moved from the scanning device 1 against the insertion direction 10 by the pin 45 present at the first arm 43 of said lever. It is achieved in this way that the integrated circuit card 2 is passed so far from the reading device 1 that also in the case in which the scanning device is accommodated in a housing of an appliance, for example, of a telephone set or a different appliance, the integrated circuit card 2 can be easily gripped by a user and completely removed from the reading device 1 or the appliance containing the reading device 1, as applicable. It should be noted that the shifting movement of the slide 19 caused by actuation of the manual control 38 in the insertion direction 10 may be limited in that the two slots 27 and 28 provided in the bridge portion 22 of the slide 19 hit with their ends facing the inlet opening 9 against the oval projections 14 and 15 raised above the bottom wall 4 of the frame 3. The movement of the contact carrier 53 away from the integrated circuit card 2 may also be limited by stops at the frame side, whereby then the shifting of the slide 19 in the insertion direction is limited by the contact carrier 53 via the via-slot links 55, 56, 57, 58.

We claim:

1. A reading device for an integrated circuit card having electrical contacts, said device comprising:
    a frame with a holding space for the integrated circuit card, said frame having an inlet opening through which the integrated circuit card is insertable in an insertion direction past a read position of the circuit card into an over-position of the circuit card, said over position being spaced further from said inlet opening than said read position;
    a slide movable over said frame substantially parallel to said insertion direction between a rest position and an operating position;
    a slide spring biasing said slide in the direction opposite said insertion direction for moving said slide from said rest position to said operating position;
    a contact carrier having contacts for contacting the contacts on the circuit card, said contact carrier being movable into a contact position in which said carrier contacts engage the circuit card contacts in both said over- and read positions of the circuit card;
    coupling means coupling said contact carrier to said slide for moving said contact carrier into said contact position upon movement of said slide into said operating position;
    a locking device switchable between a blocking position, in which said slide is disposed in said rest position and locked against movement towards said operating position, and first and second release positions in which said slide is released to move towards said operating position, said locking device being in said first release position when the circuit card is in said over-position, and said locking device resting against a portion of said slide in said second release position;
    a lock spring biasing said locking device for moving said locking device from said release positions to said blocking position, said lock spring biasing said locking device with substantially less force than that which said slide spring biases said slide;
    said locking device including a control stop actuatable by the integrated circuit card for moving said locking device into said first release position upon insertion of the circuit card into said over-position, the card being insertable into said over-position with an insertion force sufficient to overcome said lock spring;
    in said first release position of said locking device, said slide being moved by said slide spring from said rest position to said operating position and said contact carrier being moved into said contact position, upon release of said insertion force on the circuit card said lock spring moving said locking device from said first release position to said second release position and said control stop on said locking device moving the circuit card from said over-position to said read position with said carrier contacts engaging the circuit card contacts, in said second release position said locking device resting against a portion of said slide in its operating position such that said control stop does not bias the circuit card towards the inlet opening;
    a manual control connected to said slide and actuatable for moving said slide from said operating position to said rest position against the biasing of said slide spring;
    upon actuation of said manual control and movement of said slide from said operating position to said rest position, said locking device being moved from said second release position into said blocking position by said lock spring and the integrated circuit card being moved from the reading position in a direction opposite said insertion direction to said inlet opening by said control stop.

2. A scanning device as claimed in claim 1, characterized in that said locking device includes a counterstop and said slide comprises a limit stop against which said counterstop rests under the force of said lock spring in said second release position of said locking device when said slide has been moved into its operating position.

3. A scanning device as claimed in claim 2, characterized in that said locking device comprises a single two-arm locking lever pivotable in said frame, one said arm including said control stop and said other arm including a blocking stop for blocking said slide in said rest position when said locking device is in said blocking position.

4. A scanning device as claimed in claim 3, characterized in that said blocking stop also forms said counterstop with which said locking lever rests against said limit stop of said slide in its second release position when said slide has been moved to said operating position.

5. A reading device as claimed in claim 4, characterized in that said slide is substantially planar and extends substantially parallel to the card surface of the integrated circuit card.

6. A reading device as claimed in claim 5, wherein said slide includes a major planar portion and two side portions projection perpendicularly therefrom, and said coupling means includes guide means for guiding said carrier perpendicularly to the circuit card.

7. A reading device as claimed in claim 6, characterized in that said guide means comprises slots in said frame.

8. A reading device as claimed in claim 7, characterized in that said coupling means comprises a pair of pins connected to said contact carrier and projecting laterally therefrom, and oblique slots in said side portions oblique to said major planar portion of said slide.

9. A reading device as claimed in claim 8, characterized in that each of the pins engages in a said oblique slot and a said frame slot.

10. A reading device as claimed in claim 9, characterized in that said contact carrier comprises a pressure element arranged next to said contacts for pressing the integrated circuit card against a support surface at the frame when said slide is positioned in said operating position and said contact carrier has been moved towards the integrated circuit card.

11. A reading device as claimed in claim 6, characterized in that said coupling means comprises a pair of pins connected to said contact carrier and projecting laterally therefrom, and oblique slots in said side portions oblique to said major planar portion of said slide.

12. A reading device as claimed in claim 11, characterized in that said contact carrier comprises a pressure element arranged next to said contacts for pressing the integrated circuit card against a support surface at the frame when said slide is positioned in said operating position and said contact carrier has been moved towards the integrated circuit card.

13. A reading device as claimed in claim 6, characterized in that said contact carrier comprises a pressure element arranged next to said contacts for pressing the integrated circuit card against a support surface at the frame when said slide is positioned in said operating position and said contact carrier has been moved towards the integrated circuit card.

14. A reading device as claimed in claim 2, characterized in that said blocking stop also forms said counterstop with which said locking device rests against said limit stop of said slide in said second release position of said locking device when said slide has been moved to said operating position.

15. A reading device as claimed in claim 14, characterized in that said slide is substantially planar and extends surface substantially parallel to the card surface of the integrated circuit card.

16. A reading device as claimed in claim 15, wherein said slide includes a major planar portion and two side portions projecting perpendicularly therefrom, said coupling means includes guide means for guiding said carrier perpendicularly to said circuit card.

17. A reading device as claimed in claim 16, characterized in that said contact carrier comprises a pressure element arranged next to said contacts for pressing the integrated circuit card against a support surface at the frame when said slide is positioned in said operating position and said contact carrier has been moved towards the integrated circuit card.

18. A reading device as claimed in claim 1, characterized in that said locking device comprises a single two-arm locking lever pivotable in said frame, one said arm including said control stop and said other arm including a blocking stop for blocking said slide in said rest position in said blocking position of said locking lever.

19. A reading device as claimed in claim 18, characterized in that said blocking stop also forms said counterstop with which said locking lever rests against said limit stop of said slide in said second release position of said locking lever when said slide has been moved to said operating position.

20. A reading device as claimed in claim 19, characterized in that said slide is substantially planar and extends substantially parallel to the card surface of the integrated circuit card.

21. A reading device as claimed in claim 1, characterized in that said slide is substantially planar and extends substantially parallel to the card surface of the integrated circuit card.

* * * * *